I. M. JACOBS & W. CRAMER.
SUPPORT FOR CRANK SHAFTS.
APPLICATION FILED OCT. 26, 1917.
1,299,950. Patented Apr. 8, 1919.
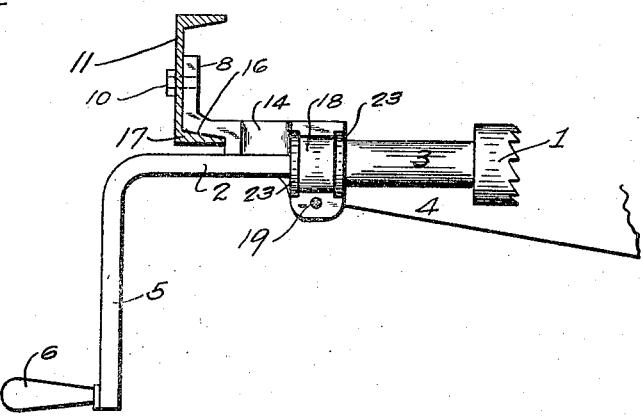
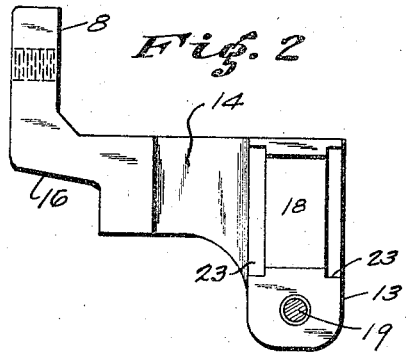
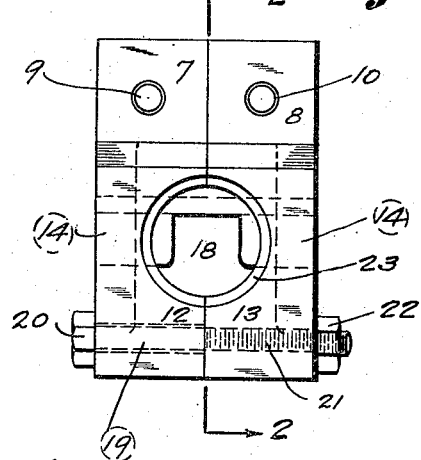
Inventor
Isidor M. Jacobs,
William Cramer,
By Hugh K. Wagner
Attorney

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

SUPPORT FOR CRANK-SHAFTS.

1,299,950.      Specification of Letters Patent.      Patented Apr. 8, 1919.

Application filed October 26, 1917. Serial No. 198,642.

*To all whom it may concern:*

Be it known that we, ISIDOR M. JACOBS and WILLIAM CRAMER, citizens of the United States, residing at Kansas City, in the county of Jackson and State of Missouri, and St. Louis, State of Missouri, respectively, have invented certain new and useful Improvements in Supports for Crank-Shafts, of which the following is a specification.

This invention, while it may be of general utility, is especially designed in aid of the salvaged constructions contemplated by the application for patent Serial Number 163,652, filed by one of the joint inventors herein named, and consists of a bracket support for the crank shaft of a motor at the forward end of the engine.

In the accompanying drawings forming a part of this specification, in which like numbers of reference denote like parts wherever they occur, Figure 1 is a side elevation showing the attachment of this device to the chassis and its relation to adjoining parts;

Fig. 2 is a sectional view on the line 2—2 in Fig. 3;

Fig. 3 is a front elevation; and

Fig. 4 is a bottom plan view.

The starting crank ratchet 1 is connected with the drive shaft (not shown in the drawings) in the usual manner, and is itself fixed to crank shaft 2 which passes through starting sleeve 3 supported by the power plant housing 4. To the shaft 2 is connected the starting crank 5 having the handle 6.

The device of this invention is formed in two separate sections, 7 and 8, which are respectively attached by bolts 9 and 10 to the web of the channel member 11 forming the front part of the chassis.

Connecting the upright parts of the members 7 and 8 that are attached to the channel member 11 with the depending parts 12 and 13, is a pair of body portions 14 having a hollowed out space 15 between them. The slant 16 on the underneath side of the members 7 and 8 fits the slant of the flange 17 on the channel member 11.

The uprights of members 7 and 8 are held together in proper relation by the bolts 9 and 10 that fasten them to the channel member 11 and after the crank shaft 2 has been fitted into the hole 18 between the parts 7 and 8, the said parts and the depending members 12 and 13 thereof are tightly drawn together by the bolt 19 having the head 20, screw-threaded part 21, and the lock-nut 22.

A counter-sink 23 is formed around the hole 18 so as to afford a movement-limiting stop for the crank shaft 2.

Having thus described this invention, we hereby reserve the benefit of all changes in form, arrangement, order, or use of parts, as it is evident that many minor changes may be made therein without departing from the spirit of this invention, or the scope of the following claims.

We claim:

1. A bracket for supporting a crank for an automobile, comprising a pair of similar abutting sections, said bracket having a front upwardly disposed extension and a rear depending extension, the rear portion of the bracket having a longitudinal counter-sunk opening, the bottom of the bracket between the vertical planes of the front and rear extensions being provided with a longitudinal slot which is in alinement with the longitudinal opening whereby to form a two point support for a shaft, and means for securing the abutting sections together.

2. In combination, a channel member having an inclined flange, a two part bracket having its forward bottom surface inclined to engage and be supported on the inclined flange of the channel member, bolts for attaching the two part bracket to the channel member, said two part bracket having a longitudinal opening, a sleeve in the opening, and a crank shaft mounted in the sleeve.

3. In combination, a channel member, a bracket comprising two abutting sections, each provided with a recess, counter-sunk at opposite ends, the two recesses forming a bearing, a sleeve fitted in the bearing, said sleeve having flanges which fit in the counter-sunk ends of the recesses, said sections having a flange at the front thereof snugly to engage the channel member and the front part of each of the said sections also being so located as to engage a flange of the said channel member, bolts for securing the sections to the channel member, means at the rear of the bracket for clamping the two sections together, and a shaft extending through the sleeve.

4. A bracket for the purpose specified comprising two abutting sections, each section having a front upwardly extended extension provided with openings, a depending rear extension provided with transverse openings, the rear extensions having formed therein a counter-sunk recess which when the sections abut form a longitudinal bearing, and said sections being formed with vertical notches intermediate the extensions to provide an intermediate vertical opening in the bracket when the sections are together.

In testimony whereof we hereunto affix our signatures.

ISIDOR M. JACOBS.
WILLIAM CRAMER.